(12) United States Patent
Singh et al.

(10) Patent No.: US 11,300,266 B1
(45) Date of Patent: Apr. 12, 2022

(54) MODULAR TAILGATE LIGHT

(71) Applicant: HOPKINS MANUFACTURING CORPORATION, Emporia, KS (US)

(72) Inventors: Iqbal Singh, Buffalo Grove, IL (US); Chris Connington, Long Grove, IL (US); Eric Li, Enping (CN)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 17/069,007

(22) Filed: Oct. 13, 2020

(51) Int. Cl.
| | |
|---|---|
| *B60Q 1/00* | (2006.01) |
| *F21S 43/15* | (2018.01) |
| *F21S 43/14* | (2018.01) |
| *F21S 43/19* | (2018.01) |
| *F21V 21/096* | (2006.01) |
| *F21S 2/00* | (2016.01) |
| *F21Y 115/10* | (2016.01) |
| *F21W 103/45* | (2018.01) |
| *F21W 103/35* | (2018.01) |

(52) U.S. Cl.
CPC .............. *F21S 43/15* (2018.01); *F21S 2/005* (2013.01); *F21S 43/14* (2018.01); *F21S 43/195* (2018.01); *F21V 21/096* (2013.01); *F21W 2103/35* (2018.01); *F21W 2103/45* (2018.01); *F21Y 2115/10* (2016.08)

(58) Field of Classification Search
CPC .. F21S 43/15; F21S 2/005; F21S 43/14; F21S 4/22; F21S 43/51; F21Y 2115/10; B60Q 1/2692; B60Q 1/0088; B60Q 1/46; B60Q 1/52; B60Q 1/506; B60Q 1/503; F21V 21/005; F21V 23/06
See application file for complete search history.

(56) References Cited

U.S. PATENT DOCUMENTS

| | | | |
|---|---|---|---|
| 2004/0252501 A1* | 12/2004 | Moriyama | ........... F21V 19/0025 362/238 |
| 2010/0008090 A1* | 1/2010 | Li | ............... F21S 4/24 362/249.03 |
| 2010/0271804 A1* | 10/2010 | Levine | ....................... F21S 4/20 362/35 |
| 2014/0198510 A1* | 7/2014 | Law | ......................... B60Q 3/35 362/485 |
| 2014/0268775 A1* | 9/2014 | Kennemer | ............ F21V 21/145 362/249.03 |
| 2018/0058674 A1* | 3/2018 | Reynolds | .............. F21V 17/002 |
| 2020/0173623 A1* | 6/2020 | Elwell | ................... F21S 41/645 |

\* cited by examiner

*Primary Examiner* — Omar Rojas Cadima
(74) *Attorney, Agent, or Firm* — Hovey Williams LLP

(57) ABSTRACT

A modular tailgate light for a vehicle having an auxiliary lighting plug, the modular tailgate light broadly including a left section, a right section, a middle section, and a power connector. The left section, the right section, and the middle section each include a set of red lights and a set of white lights. The red lights of the middle section include left red lights and right red lights. The modular tailgate light can be used in a small vehicle configuration in which the left and right sections are connected together with the middle section omitted and a large vehicle configuration in which the middle section is connected between the left and right sections. In the large vehicle configuration, the left red lights activate identically to the red lights of the left section and the right red lights activate identically to the red lights of the right section.

16 Claims, 4 Drawing Sheets

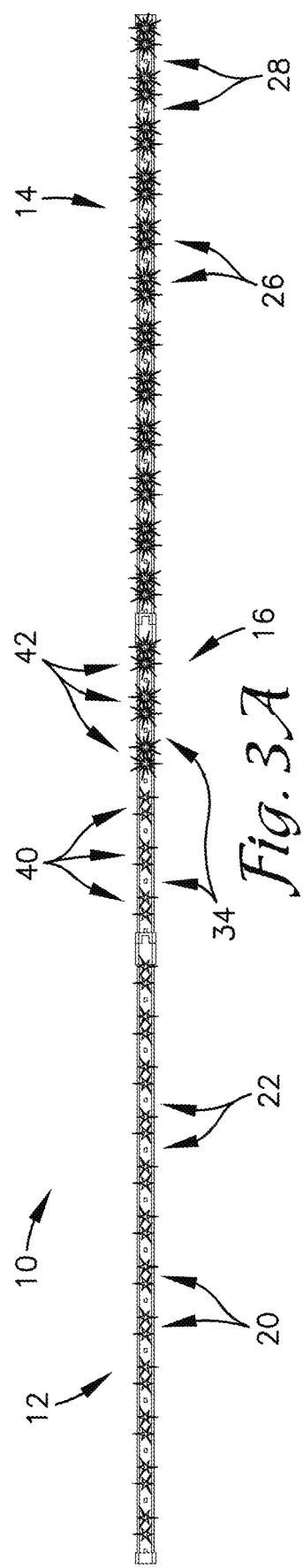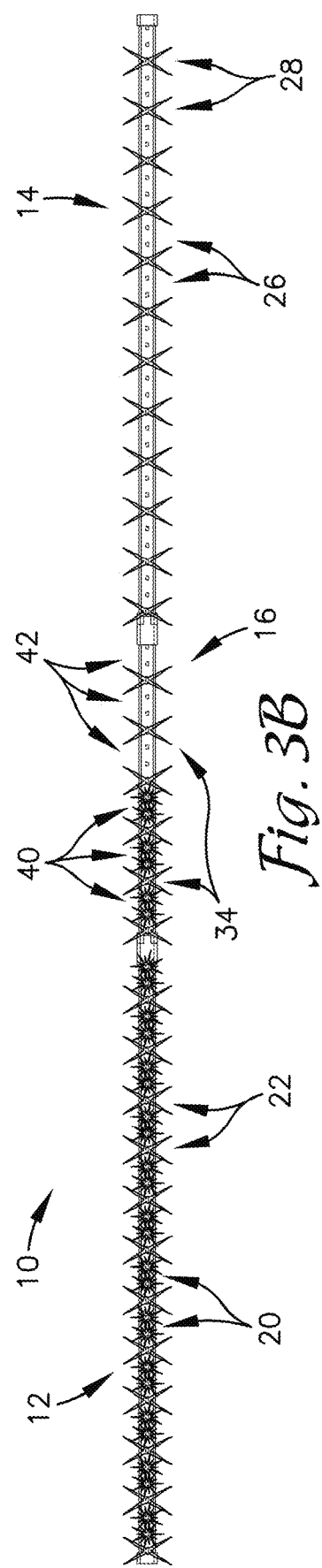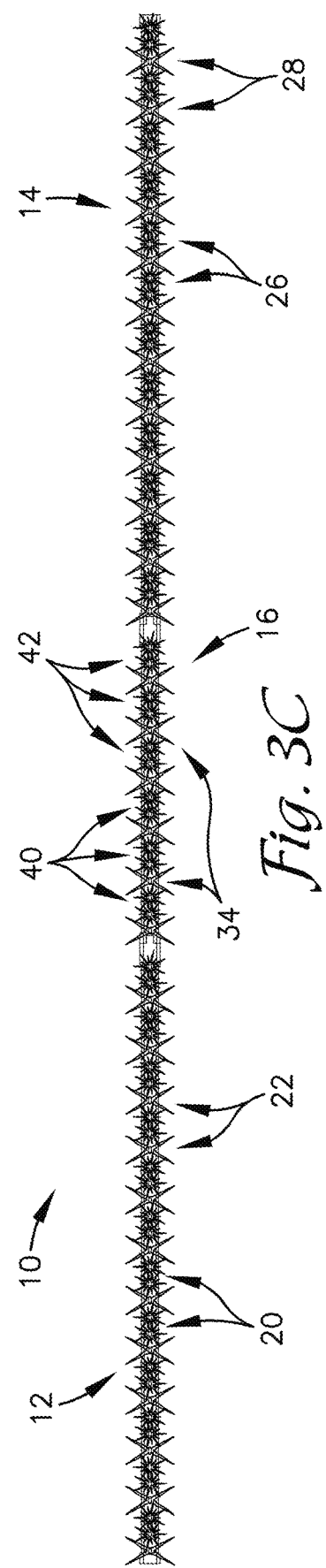

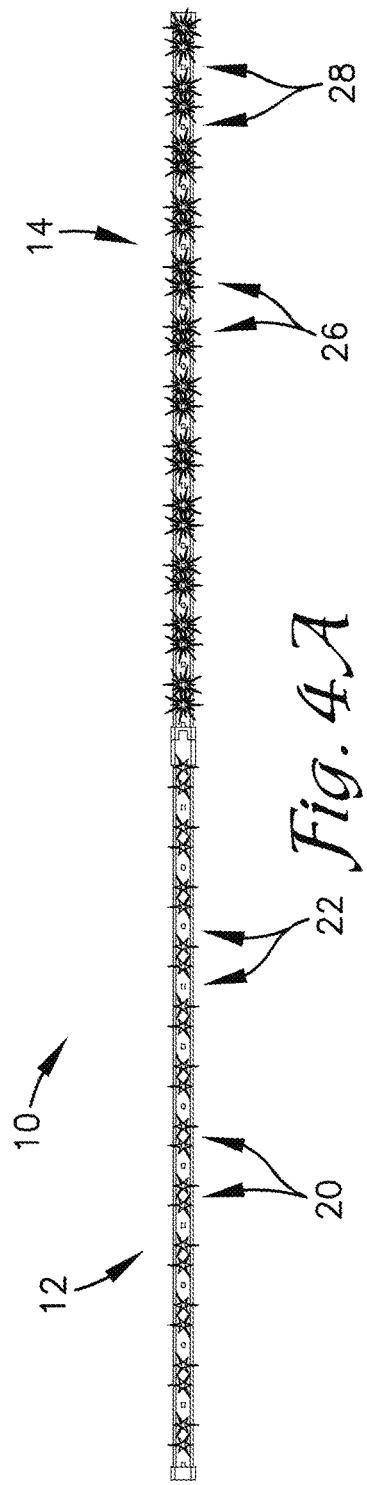
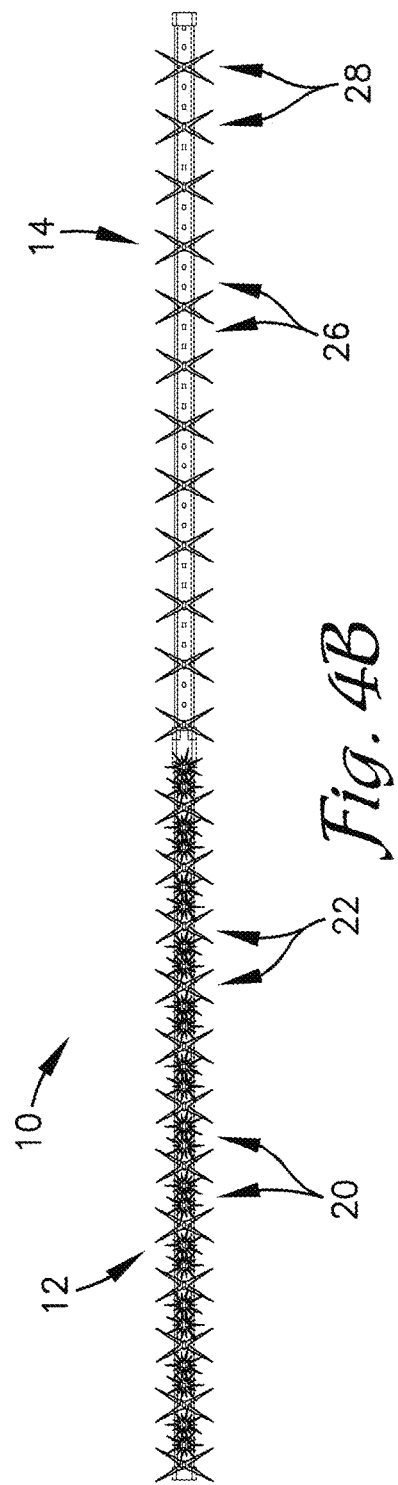
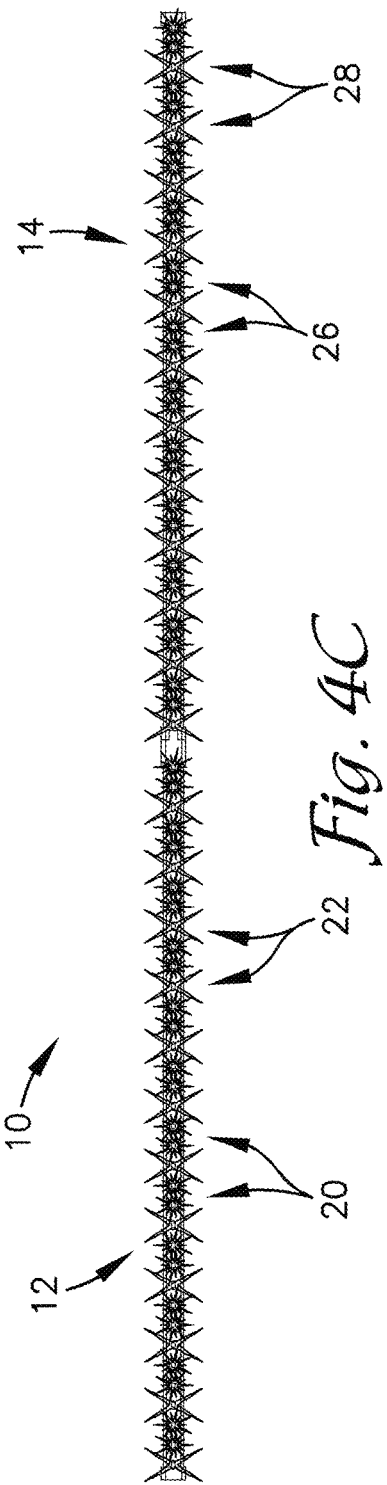

MODULAR TAILGATE LIGHT

BACKGROUND

Auxiliary tailgate lights supplement rear vehicle lights when increased vehicle visibility is desired. Auxiliary tailgate lights include a fixed-length elongated bar or strip of spaced apart light emitters configured to be positioned near a vehicle's tailgate or bumper. The auxiliary tailgate light's fixed length prevents long auxiliary tailgate lights from being used on smaller vehicles. Users wanting maximum auxiliary lighting on their larger vehicles and smaller vehicles are forced to buy a long auxiliary tailgate light for their larger vehicles and a short auxiliary tailgate light for their smaller vehicles, even if only one vehicle is used at any one time. Other auxiliary tailgate lights include several components that can be installed incorrectly.

SUMMARY

Embodiments of the invention solve the above-mentioned problems and other problems and provide a distinct advancement in the art of auxiliary tailgate lights. More particularly, the invention provides a modular tailgate light assembly that can be used in a large vehicle configuration and a small vehicle configuration.

An embodiment of the invention is a modular tailgate light assembly broadly comprising a left section, a right section, a middle section, and a power connector.

The left section includes a set of red LEDs, a set of white LEDs, and an electrical connector. The left section may be a solid bar or a flexible strip or band configured to be coiled up when the modular tailgate light is not in use. The left section may have a nominal length of approximately twenty-four inches.

The red LEDs are laterally spaced apart from each other on the left section and may be light emitting diodes (LEDs), light bulbs, or the like. The red LEDs emit dim light upon the modular tailgate light receiving a tail light signal and bright light upon the modular tailgate light receiving a left turn signal, a brake signal, or a vehicle reverse signal.

The white LEDs are laterally spaced apart from each other on the left section and may be light emitting diodes (LEDs), light bulbs, or the like. The white LEDs emit bright white light upon the modular tailgate light receiving a vehicle reverse signal.

The electrical connector electrically connects the left section to the middle section or the right section. The electrical connector may be a plug, a wiring harness, a set of electrical pins or contacts, or the like. The electrical connector may be one of two types of connectors configured to connect with the other one of the two types of connectors. For example, the electrical connector may be a male connector configured to connect with female connectors. Alternatively, the electrical connector may be configured to connect with other connectors identical to itself.

The right section includes a set of red LEDs, a set of white LEDs, and an electrical connector. The right section may have a nominal length of approximately twenty-four inches.

The red LEDs of the right section are laterally spaced apart from each other. The red LEDs of the right section emit dim light upon the modular tailgate light receiving a tail light signal and bright light upon the modular tailgate light receiving a right turn signal, a brake signal, or a vehicle reverse signal.

The white LEDs are laterally spaced apart from each other on the right section. The white LEDs of the right section emit bright white light upon the modular tailgate light receiving a reverse signal.

The electrical connector electrically connects the right section to the middle section or the left section. The electrical connector may be a plug, a wiring harness, a set of electrical pins or contacts, or the like. The electrical connector may one of two types of connectors configured to connect with the other one of the two types of connectors. For example, the electrical connector may be a female connector configured to connect with male connectors. Alternatively, the electrical connector may be configured to connect with other connectors identical to itself.

The middle section includes a set of red LEDs, a set of white LEDs, a left electrical connector, and a right electrical connector. The middle section may have a nominal length of approximately twelve inches.

The red LEDs of the middle section include left red LEDs and right red LEDs. The red LEDs of the middle section are laterally spaced apart from each other.

The left red LEDs are positioned on a left side of the middle section. The left red LEDs are configured to be activated identically with the red LEDs of the left section when the modular tailgate light is assembled in a large vehicle configuration as described in more detail below. The left red LEDs emit dim light upon the modular tailgate light receiving a tail light signal and bright light upon the modular tailgate light receiving a right turn signal, a brake signal, or a vehicle reverse signal.

The right red LEDs are positioned on a right side of the middle section. The right red LEDs are configured to be activated identically with the red LEDs of the right section when the modular tailgate light is assembled in the large vehicle configuration as described in more detail below. The right red LEDs emit dim light upon the modular tailgate light receiving a tail light signal and bright light upon the modular tailgate light receiving a right turn signal, a brake signal, or a vehicle reverse signal.

The white LEDs of the middle section are laterally spaced apart from each other on the middle section. The white LEDs of the middle section emit bright white light upon the modular tailgate light receiving a vehicle reverse signal.

The left electrical connector electrically connects the middle section to the left section. The left electrical connector may be a plug, a wiring harness, a set of electrical pins or contacts, or the like. The left electrical connector may be one of two types of connectors configured to connect with the other one of the two types of connectors. For example, the left electrical connector may be a female connector configured to connect with a male connector. Alternatively, the left electrical connector may be configured to connect with another connector identical to itself.

The right electrical connector electrically connects the middle section to the right section. The right electrical connector may be a plug, a wiring harness, a set of electrical pins or contacts, or the like. The right electrical connector may be one of two types of connectors configured to connect with the other one of the two types of connectors. For example, the right electrical connector may be a male connector configured to connect with a female connector. Alternatively, the right electrical connector may be configured to connect with another connector identical to itself.

The power connector extends from one of the left section, the right section, and the middle section and is configured to electrically connect the modular tailgate light an auxiliary lighting plug of the vehicle. The power connector may be a wiring harness, a plug, a power cord, or the like. In one embodiment, the power connector is a wiring harness configured to be connected to a trailer lighting plug of the vehicle.

In use, the modular tailgate light can be assembled in a large vehicle configuration or a small vehicle configuration. A user may determine whether the large vehicle configuration or the small vehicle configuration should be used depending on whether the vehicle is large or small or depending on an available tailgate width.

In the large vehicle configuration, the left section and the right section are connected to the middle section. Specifically, the electrical connector of the left section engages the left electrical connector of the middle section and the electrical connector of the right section engages the right electrical connector of the middle section. The red LEDs on the left side of the middle section are activated identically to the red LEDs of the left section, and the red LEDs on the right side of the middle section are activated identically to the red LEDs of the right section.

In the small vehicle configuration, the left section is connected directly to the right section. The middle section is omitted from this configuration and may be stored for later use.

The above-described modular tailgate light provides several advantages. For example, the modular tailgate light can be used in the large vehicle configuration or the small vehicle configuration without any change in functionality. The modular tailgate light does not require any knowledge of electrical wiring to assemble the modular tailgate light in the large vehicle configuration or the small vehicle configuration. The modular tailgate light cannot be assembled incorrectly. That is, the left side of the middle section can only be connected to the left section and the right side of the middle section can only be connected to the right section. The middle section has left and right red LEDs that are operated identically with the red LEDs of the left section and right section, respectively. This solves the problem of keeping the modular tailgate light symmetric even when adding a single extension. The modular tailgate light attaches to the vehicle via magnetism or fasteners.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3A is an elevation view of the modular tailgate light of FIG. 1 in a large vehicle configuration;

FIG. 3B is another elevation view of the modular tailgate light of FIG. 1 in the large vehicle configuration;

FIG. 3C is another elevation view of the modular tailgate light of FIG. 1 in the large vehicle configuration;

FIG. 4A is an elevation view of the modular tailgate light of FIG. 1 in a small vehicle configuration;

FIG. 4B is another elevation view of the modular tailgate light of FIG. 1 in the small vehicle configuration; and FIG. 4C is another elevation view of the modular tailgate light of FIG. 1 in the small vehicle configuration.

Figure 1:
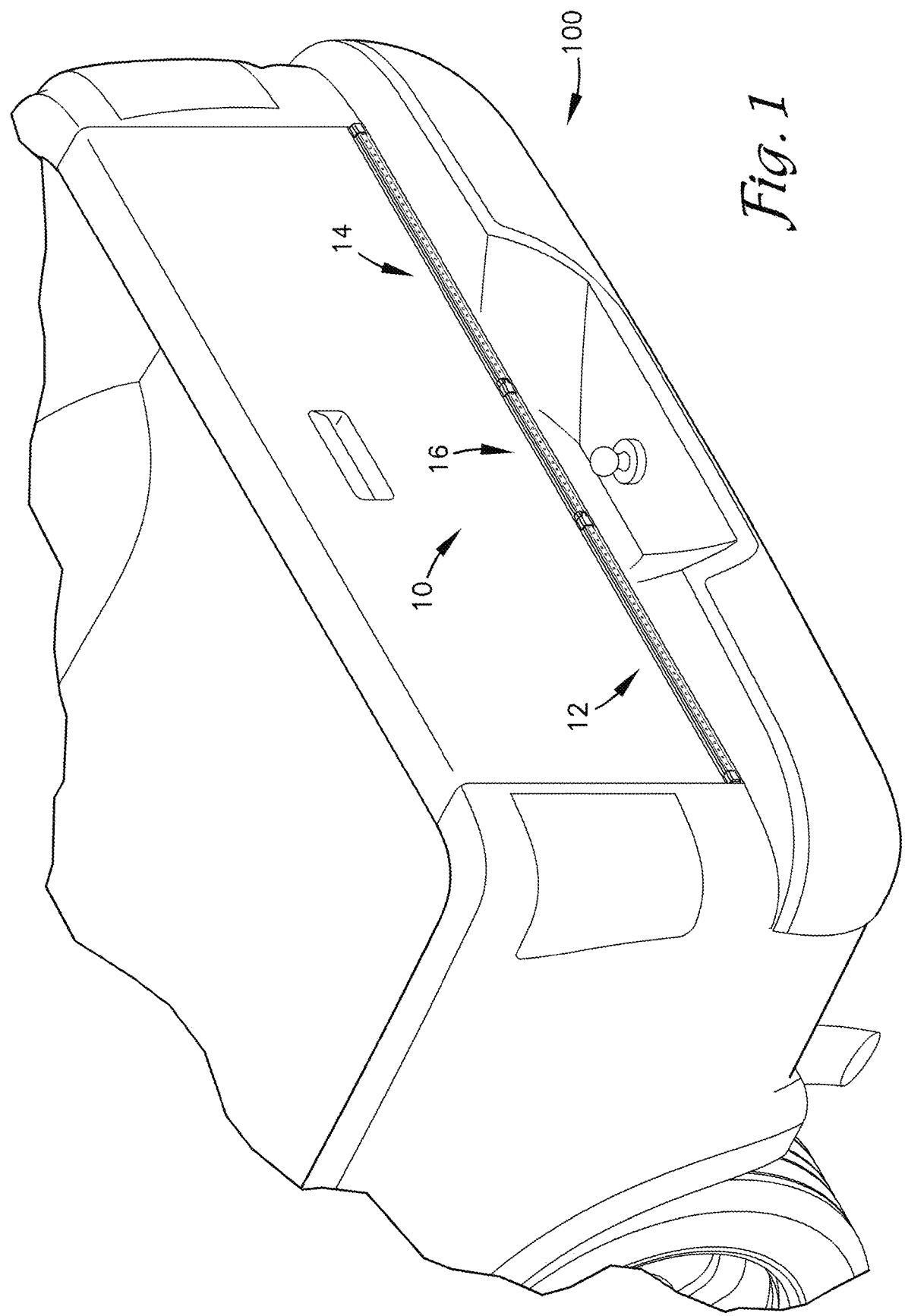
FIG. 1 is a perspective view of a modular tailgate light constructed in accordance with an embodiment of the invention and shown installed on a vehicle.
Figure 2:
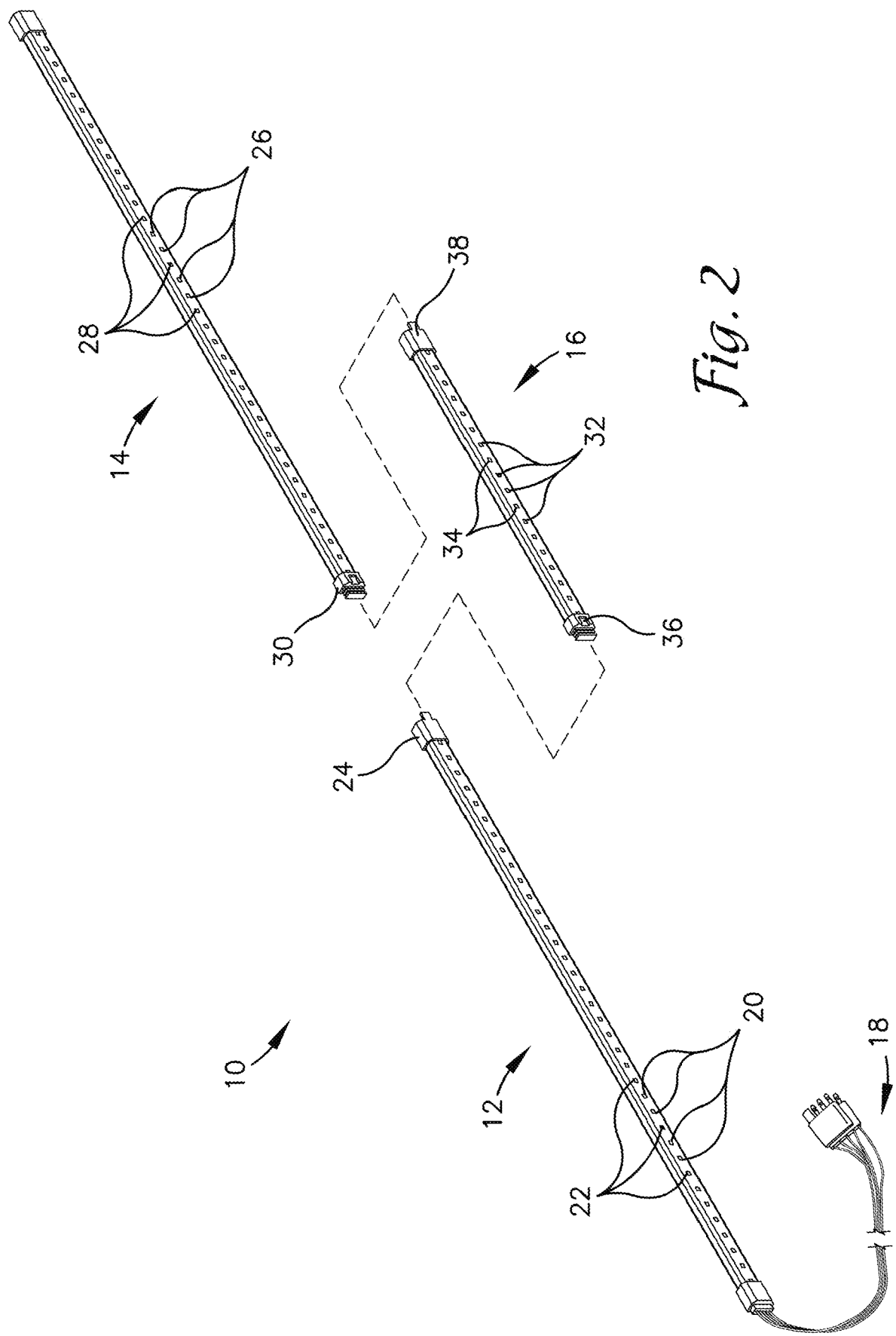
FIG. 2 is a perspective exploded view of the modular tailgate light of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turing to the drawing figures, a modular tailgate light 10 constructed in accordance with an embodiment of the invention is illustrated. The modular tailgate light 10 broadly comprises a left section 12, a right section 14, a middle section 16, and a power connector 18. The modular tailgate light 10 may be used with large vehicles such as full-size pickup trucks, smaller pickup trucks, vans, cars, trailers, farm implements, specialized work vehicles, and the like. The modular tailgate light 10 is shown in FIG. 1 mounted above a tailgate of a large pickup truck 100.

The left section 12 includes a first plurality of light emitters 20, a second plurality of light emitters 22, and an electrical connector 24. The left section 12 may be a solid bar or a flexible strip or band configured to be coiled up when the modular tailgate light 10 is not in use. The left section 12 may have a nominal length of approximately twenty-four inches.

The first plurality of light emitters 20 may be laterally spaced apart from each other on the left section 12 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the first plurality of light emitters 20. The first plurality of light emitters 20 emit colored light beams such as red, orange, or yellow for braking, turn signals, and general visibility.

The second plurality of light emitters 22 may be laterally spaced apart from each other on the left section 12 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the second plurality of light emitters 22. The second plurality of light emitters 22 emit white light beams for vehicle reversing and general visibility.

The electrical connector 24 electrically connects the left section 12 to the middle section 16 or the right section 14. The electrical connector 24 may be a plug, a wiring harness, a set of electrical pins or contacts, or the like. The electrical connector 24 may be one of two types of connectors configured to connect with the other one of the two types of connectors. For example, the electrical connector 24 may be a male connector configured to connect with female connectors. Alternatively, the electrical connector 24 may be configured to connect with other connectors identical to itself.

The right section 14 includes a first plurality of light emitters 26, a second plurality of light emitters 28, and an electrical connector 30. The right section 14 may have a nominal length of approximately twenty-four inches.

The first plurality of light emitters 26 may be laterally spaced apart from each other on the right section 14 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the first plurality of light emitters 26. The first plurality of light emitters 20 emit colored light beams such as red, orange, or yellow for braking, turn signals, and general visibility.

The second plurality of light emitters 28 may be laterally spaced apart from each other on the right section 14 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the second plurality of light emitters 28. The second plurality of light emitters 28 emit white light beams for vehicle reversing and general visibility.

The electrical connector 30 electrically connects the right section 14 to the middle section 16 or the left section 12. The electrical connector 30 may be a plug, a wiring harness, a set of electrical pins or contacts, or the like. The electrical connector 30 may one of two types of connectors configured to connect with the other one of the two types of connectors. For example, the electrical connector 30 may be a female connector configured to connect with male connectors. Alternatively, the electrical connector 30 may be configured to connect with other connectors identical to itself.

The middle section 16 includes a first plurality of light emitters 32, a second plurality of light emitters 34, a left electrical connector 36, and a right electrical connector 38. The middle section 16 may have a nominal length of approximately twelve inches.

The first plurality of light emitters 32 includes a set of left light emitters 40 and a set of right light emitters 42. The first plurality of light emitters 32 may be laterally spaced apart from each other on the middle section 16 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the first plurality of light emitters 32. The first plurality of light emitters 32 emit colored light beams such as red, orange, or yellow for braking, turn signals, and general visibility.

The left light emitters 40 are positioned on a left side of the middle section 16. The left light emitters 40 are configured to be activated identically with the first plurality of light emitters 20 of the left section 12 when the modular tailgate light 10 is assembled in a large vehicle configuration as described in more detail below.

The right light emitters 42 are positioned on a right side of the middle section 16. The right light emitters 42 are configured to be activated identically with the first plurality of light emitters 26 of the right section 14 when the modular tailgate light 10 is assembled in the large vehicle configuration as described in more detail below.

The second plurality of light emitters 34 may be laterally spaced apart from each other on the middle section 16 and may be light emitting diodes (LEDs), light bulbs, or the like. Alternatively, one or a plurality of light bars or elongated light tubes may be used. In another embodiment, one or a plurality of light emitters may illuminate a light enclosure. To that end, reflectors, light cones, lenses, or the like may be used to increase or focus the luminosity of the second plurality of light emitters 34. The second plurality of light emitters 34 emit white light beams for vehicle reversing and general visibility.

The left electrical connector 36 electrically connects the middle section 16 to the left section 12. The left electrical connector 36 may be a plug, a wiring harness, a set of electrical pins or contacts, or the like. The left electrical connector 36 may be one of two types of connectors configured to connect with the other one of the two types of connectors. For example, the left electrical connector 36 may be a female connector configured to connect with a male connector. Alternatively, the left electrical connector 36 may be configured to connect with another connector identical to itself.

The right electrical connector 38 electrically connects the middle section 16 to the right section 14. The right electrical connector 38 may be a plug, a wiring harness, a set of electrical pins or contacts, or the like. The right electrical connector 38 may be one of two types of connectors configured to connect with the other one of the two types of connectors. For example, the right electrical connector 38 may be a male connector configured to connect with a female connector. Alternatively, the right electrical connector 38 may be configured to connect with another connector identical to itself.

The power connector 18 extends from one of the left section 12, the right section 14, and the middle section 16 and is configured to electrically connect the modular tailgate light 10 an auxiliary lighting plug of the vehicle. The power connector 18 may be a wiring harness, a plug, a power cord, or the like. In one embodiment, the power connector 18 is a wiring harness configured to be connected to a trailer lighting plug of the vehicle. The power connector 18 may include a ground wire and several hot wires including left and right turn signal wires, brake signal wires, taillight wires, reverse signal wires, and the like. The power connector 18 may include a five-pin flat connector, a five-pin round connector, or the like.

Use of the modular tailgate light 10 will now be described in more detail. The modular tailgate light 10 can be used in a large vehicle configuration (FIGS. 1-3C) and a small vehicle configuration (FIGS. 4A-C). A user may determine whether the small vehicle configuration or the large vehicle configuration should be used depending on whether the vehicle is large or small or depending on an available tailgate width.

In the large vehicle configuration, the left section 12 and the right section 14 are connected to the middle section 16. Specifically, the electrical connector 24 of the left section 12 engages the left electrical connector 36 of the middle section 16 and the electrical connector 30 of the right section 14 engages the right electrical connector 38 of the middle section 16. The modular tailgate light 10 works the same in the large vehicle configuration as the small vehicle configuration except the left light emitters 40 of the middle section 16 activate identically to the first plurality of light emitters 20 of the left section 12, the right light emitters 42 of the middle section 16 activate identically to the first plurality of light emitters 26 of the right section 14, and the second plurality of light emitters 34 of the middle section 16 activate identically to the second plurality of light emitters 26 of the left section 12 and the second plurality of light emitters 28 of the right section 14.

FIGS. 3A-C show the modular tailgate light 10 in the large vehicle configuration in various exemplary lighting scenarios. For example, FIG. 3A shows right turn signaling and a relatively dimmer tail light. FIG. 3B shows left turn signaling with reverse lighting. FIG. 3C shows brake lighting and reverse lighting. Note the left light emitters 40 of the first plurality of light emitters 32 of the middle section 16 are activated identically to the first plurality of light emitters 20 of the left section 12 and the right light emitters 42 of the first plurality of light emitters 32 of the middle section 16 are activated identically to the first plurality of light emitters 26 of the right section 14.

In the small vehicle configuration, the left section 12 is connected directly to the right section 14 via the electrical connector 24 of the left section 12 and the electrical connector 30 of the right section 14. The middle section 16 is omitted from this configuration and may be stored for later use.

FIGS. 4A-C show the modular tailgate light 10 in the small vehicle configuration in various exemplary lighting scenarios. For example, FIG. 4A shows right turn signaling and a relatively dimmer tail light. FIG. 4B shows left turn signaling with reverse lighting. FIG. 4C shows brake lighting and reverse lighting.

The above-described modular tailgate light 10 provides several advantages. For example, the modular tailgate light 10 can be used in the large vehicle configuration or the small vehicle configuration without any change in functionality. The modular tailgate light 10 does not require any knowledge of electrical wiring to assemble the modular tailgate light 10 in the large vehicle configuration or the small vehicle configuration. The modular tailgate light 10 cannot be assembled incorrectly. That is, the left side of the middle section 16 can only be connected to the left section 12 and the right side of the middle section 16 can only be connected to the right section 14. The middle section 16 has left and rights sets of colored lights that are operated identically with the colored lights of the left section and right section, respectively. This solves the problem of keeping the modular tailgate light 10 symmetric even when adding a single extension. The modular tailgate light 10 attaches to the vehicle via magnetism or fasteners.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A modular tailgate light for a vehicle having an auxiliary lighting plug, the modular tailgate light comprising:
a left section having opposing left and right ends, the left section including:
a first plurality of light emitters between the left and right ends of the left section, the first plurality of light emitters of the left section configured to emit colored light beams and configured to blink when the modular tailgate light receives a left turn signal;
a second plurality of light emitters between the left and right ends of the left section and configured to emit white light beams; and
an electrical connector near the right end of the left section;
a right section having opposing left and right ends, the right section including:
a first plurality of light emitters between the left and right ends of the right section, the first plurality of light emitters of the right section configured to emit colored light beams and configured to blink when the modular tailgate light receives a right turn signal;
a second plurality of light emitters between the left and right ends of the right section and configured to emit white light beams; and
an electrical connector near the left end of the right section;
a middle section configured to be positioned between the left section and the right section, the middle section having opposing left and right ends and including:
a first plurality of light emitters between the left and right ends of the middle section and configured to emit colored light beams, the first plurality of light emitters of the middle section including left light emitters and right light emitters;
a second plurality of light emitters between the left and right ends of the middle section and configured to emit white light beams;
a left electrical connector near the left end of the middle section, the left electrical connector configured to engage the electrical connector of the left section; and
a right electrical connector near the right end of the middle section, the right electrical connector configured to engage the electrical connector of the right section; and
a wiring harness configured to electrically connect the modular tailgate light to the auxiliary lighting plug of the vehicle,
the modular tailgate light being configured to be assembled in:
a small vehicle configuration in which the electrical connector of the left section engages the electrical connector of the right section and the middle section is omitted from the small vehicle configuration; and a large vehicle configuration in which the electrical connector of the left section engages the left electrical connector of the middle section and the electrical connector of the right section engages the right electrical connector of the middle section, the left light emitters being configured to be activated identically with the first plurality of light emitters of the left section and the right light emitters being configured to be activated identically with the first plurality of light emitters of the right section so that the left light emitters and right light emitters can be activated independently of each other when the modular tailgate light is assembled in the large vehicle configuration.

2. The modular tailgate light of claim 1, wherein the electrical connector of the left section and the right electrical connector of the middle section are identical and the electrical connector of the right section and the left electrical connector of the middle section are identical.

3. The modular tailgate light of claim 1, wherein the second plurality of light emitters of the left section, the right section, and the middle section are configured to be activated when the modular tailgate light receives a vehicle-reversing signal.

4. The modular tailgate light of claim 1, wherein the auxiliary lighting plug of the vehicle is a trailer lighting plug and the modular tailgate light is configured to be connected to the trailer lighting plug via the wiring harness.

5. The modular tailgate light of claim 1, wherein the left section, the right section, and the middle section are flexible strips configured to be coiled up when the modular tailgate light is not in use.

6. The modular tailgate light of claim 1, wherein the left section, the right section, and the middle section are magnetic for removably attaching the modular tailgate light to the vehicle.

7. The modular tailgate light of claim 1, wherein each plurality of light emitters are wired in parallel so that the modular tailgate light is fully functional even if any one of the light emitters fails.

8. The modular tailgate light of claim 1, wherein the left section has a nominal length of twenty-four inches, the right section has a nominal length of twenty-four inches, and the middle section has a nominal length of twelve inches so that the modular tailgate light has a nominal length of sixty inches in the large vehicle configuration and a nominal length of forty-eight inches in the small vehicle configuration.

9. The modular tailgate light of claim 1, wherein the left light strip has a nominal length of twenty-four inches, the right light strip has a nominal length of twenty-four inches, and the middle light strip has a nominal length of twelve inches so that the modular tailgate light has a nominal length of sixty inches in the large vehicle configuration and a nominal length of forty-eight inches in the small vehicle configuration.

10. A modular tailgate light for a vehicle having a trailer lighting plug, the modular tailgate light comprising:
a left light strip having opposing left and right ends and including:
a first plurality of light emitting diodes (LEDs) between the left and right ends of the left light strip, the first plurality of LEDs of the left light strip configured to emit colored light beams and configured to blink when the modular tailgate light receives a left turn signal;
a second plurality of LEDs between the left and right ends of the left light strip and configured to emit white light beams; and
an electrical connector near the right end of the left light strip;
a right light strip having opposing left and right ends and including:
a first plurality of LEDs between the left and right ends of the right light strip, the first plurality of LEDs of the right light strip configured to emit colored light beams and configured to blink when the modular tailgate light receives a right turn signal;
a second plurality of LEDs between the left and right ends of the right light strip and configured to emit white light beams; and
an electrical connector near the left end of the right light strip;
a middle light strip having opposing left and right ends and including:
a first plurality of LEDs between the left and right ends of the middle light strip and configured to emit colored light beams, the first plurality of LEDs of the middle light strip including left LEDs and right LEDs;
a second plurality of LEDs between the left and right ends of the middle light strip and configured to emit white light beams;
a left electrical connector near the left end of the middle light strip and configured to engage the electrical connector of the left light strip; and
a right electrical connector near the right end of the middle light strip and configured to engage the electrical connector of the right light strip; and
a wiring harness configured to electrically connect the modular tailgate light to the trailer lighting plug of the vehicle,
the modular tailgate light being configured to be assembled in:
a small vehicle configuration in which the electrical connector of the left light strip engages the electrical connector of the right light strip and the middle light strip is omitted from the small vehicle configuration; and
a large vehicle configuration in which the electrical connector of the left light strip engages the left electrical connector of the middle light strip and the electrical connector of the right light strip engages the right electrical connector of the middle light strip,
the left LEDs being configured to be activated identically with the first plurality of LEDs of the left light strip and the right LEDs being configured to be activated identically with the first plurality of LEDs of the right light strip so that the left LEDs and right LEDs can be activated independently of each other when the modular tailgate light is assembled in the large vehicle configuration.

11. The modular tailgate light of claim 10, wherein the electrical connector of the left light strip and the right electrical connector of the middle light strip are identical and the electrical connector of the right light strip and the left electrical connector of the middle light strip are identical.

12. The modular tailgate light of claim 10, wherein the second plurality of LEDs of the left light strip, the right light strip, and the middle light strip are configured to be activated when the modular tailgate light receives a vehicle-reversing signal.

13. The modular tailgate light of claim 10, wherein the left light strip, the right light strip, and the middle light strip are flexible strips configured to be coiled up when the modular tailgate light is not in use.

14. The modular tailgate light of claim 10, wherein the left light strip, the right light strip, and the middle light strip are magnetic for removably attaching the modular tailgate light to the vehicle.

15. The modular tailgate light of claim 10, wherein each plurality of LEDs is wired in parallel so that the modular tailgate light is fully functional even if any one of the LEDs of the modular tailgate light fails.

16. A modular tailgate light for a vehicle having a trailer lighting plug, the modular tailgate light comprising:
  a left light strip having opposing left and right ends and including:
    a first plurality of light emitting diodes (LEDs) between the left and right ends of the left light strip, the first plurality of LEDs of the left light strip configured to emit red light beams and configured to blink when the modular tailgate light receives a left turn signal;
    a second plurality of LEDs between the left and right ends of the left light strip and configured to emit white light; and
    an electrical connector near the right end of the left light strip, the left light strip having a nominal length of twenty-four inches;
  a right light strip having opposing left and right ends and including:
    a first plurality of LEDs between the left and right ends of the right light strip, the first plurality of LEDs of the right light strip configured to emit red light beams and configured to blink when the modular tailgate light receives a right turn signal;
    a second plurality of LEDs between the left and right ends of the right light strip and configured to emit white light beams; and
    an electrical connector near the left end of the right light strip, the right light strip having a nominal length of twenty-four inches;
  a middle light strip having opposing left and right ends and including:
    a first plurality of LEDs between the left and right ends of the middle light strip and configured to emit red light beams, the first plurality of LEDs including left LEDs and right LEDs;
    a second plurality of LEDs between the left and right ends of the middle light strip and configured to emit white light beams;
    a left electrical connector near the left end of the middle light strip and configured to engage the electrical connector of the left light strip; and
    a right electrical connector near the right end of the middle light strip and configured to engage the electrical connector of the right light strip, the middle light strip having a nominal length of twelve inches; and
  a wiring harness configured to electrically connect the modular tailgate light to the trailer lighting plug of the vehicle,
  the modular tailgate light being configured to be assembled in:
    a small vehicle configuration in which the electrical connector of the left light strip engages the electrical connector of the right light strip and the middle light strip is omitted from the small vehicle configuration, the modular tailgate light having a nominal length of forty-eight inches in the small vehicle configuration; and
    a large vehicle configuration in which the electrical connector of the left light strip engages the left electrical connector of the middle light strip and the electrical connector of the right light strip engages the right electrical connector of the middle light strip,
  the left LEDs being configured to be activated identically with the first plurality of LEDs of the left section and the right LEDs being configured to be activated identically with the first plurality of LEDs of the right section so that the left LEDs and the right LEDs can be activated independently of each other when the modular tailgate light is assembled in the large vehicle configuration, the modular tailgate light having a nominal length of sixty inches in the large vehicle configuration.

* * * * *